United States Patent
Ishigaki

[15] 3,677,411
[45] July 18, 1972

[54] HORIZONTALLY TRAVELLING-TYPE VACUUM FILTER

[72] Inventor: Eiichi Ishigaki, Sakaide, Japan
[73] Assignee: Ishigaki Kiko Co., Ltd., Sakaide, Japan
[22] Filed: Dec. 8, 1970
[21] Appl. No.: 96,054

[52] U.S. Cl.............................210/393, 210/401, 210/405
[51] Int. Cl.........................................................B01d 31/04
[58] Field of Search....................210/386, 391, 400, 401, 405

[56] References Cited

UNITED STATES PATENTS

| | | | |
|---|---|---|---|
| 3,460,674 | 8/1969 | Eakins | 210/400 X |
| 2,097,529 | 11/1937 | Nordell | 210/393 |
| 2,370,138 | 2/1945 | Bonotto | 210/400 X |
| 2,677,467 | 5/1954 | Giorgini | 210/400 X |

Primary Examiner—John Adee
Attorney—Dawson, Tilton, Fallon & Lungmus

[57] ABSTRACT

A novel horizontally travelling-type vacuum filter wherein a conveyor belt and an endless filter medium are trained over a pair of drums so as to travel the medium together with the conveyor belt, a filtering frame belt in the form of an endless ladder is traveled on the filter medium with keeping an intimate contact with the upper face of the medium so that filtering frames are formed on the medium and slurry is charged into each of said filtering frames whereby said slurry is filtered under vacuum after once filling each of the filtering frames, so that the decrease in vacuum degree due to the ill-balanced charge of slurry is fully avoided. Further, the endless filter medium once leaves the conveyor belt after the completion of filtering and separation of cakes on the medium and washing of the medium are carried out very easily and perfectly on the way of travel of the medium in the separated state of the medium from the conveyor belt.

7 Claims, 2 Drawing Figures

3,677,411

HORIZONTALLY TRAVELLING-TYPE VACUUM FILTER

BACKGROUND

This invention relates to a novel and improved horizontally travelling-type vacuum filter, and more particularly to a horizontally travelling-type continuous vacuum filter which facilitates a good and smooth filtering operation by avoiding, during a filtering operation, the decrease in vacuum degree due to the ill-balanced charge of slurry or liquid to be filtered and the mixing of washing liquid for cakes with filtrate due to the back-flowing of the liquid and which allows a perfect and easy washing of the filter medium having been employed for filtration and an easy separation of cakes from said medium.

There are known two kinds of horizontally travelling-type vacuum filters, namely horizontal belt filter and travelling pan filter. The former filter is so constructed that an endless filter medium trained over guiding rollers is integrated on the upper and outer face of an endless conveyor belt of rubber trained over a driving drum and a take-up drum so as to allow the running of the medium together with the conveyor belt and slurry charged on the filter medium is filtered through said medium and belt under vacuum below the upper and inner face of the conveyor belt, whereas the latter or travelling pan filter is so constructed that a number of pans fixedly equipped with the filter medium run along a circular or linear horizontal path circulatorily and the filtering of slurry charged into each of the pans is carried out under vacuum, the washing of cakes remaining on the medium after filtration and the like are carried out on the way of said circulation of the pans. These horizontally travelling-type vacuum filters have such advantages that they facilitate the vacuum filtering of slurry being hard in filtering by using a rotary drum-type vacuum filter such as slurry containing larger and smaller particles of sludge or having a large density and also are very suitable for perfect washing of cakes especially by washing more than once with counter current process. The horizontally travelling-type vacuum filters according to the prior art have, however, some serious defects. That is, the horizontal belt filter has such defects due to the fact that functional zones in the travelling direction of the conveyor belt are never divided clearly, that the decrease in vacuum degree is easily caused due to the ill-balanced or non-uniform charge of slurry into filtering zone, even when the conveyor belt is provided with such filtering zone, and further washing zone and filtering zone become easily confused due to the back-flowing of washing liquid for cakes, that causes the mixing of the washing liquid with filtrate. In the well-known travelling pan filter, the washing of filter medium and the separation of cakes from said medium are very hard due to the fact that said filter medium is fixed to each of the pans.

SUMMARY

Accordingly, the primary object of the present invention is to provide a novel and improved horizontally travelling-type vacuum filter in which the above defects of the filters according to the prior art are fully avoided and the aforementioned advantages of horizontally travelling-type vacuum filter are given effectively.

The above object is attained according to the present invention by training, in a horizontally travelling-type vacuum filter, an endless conveyor belt of stainless steel or the like with outer lining of rubber having filter medium-supporting bed formed with said lining of rubber and an endless filter medium integrated on the upper and outer face of said conveyor belt over a driving drum and a take-up drum, providing, below the conveyor belt, a suction or vacuum box which is slidably engaged with the inner face of stainless steel or the like of the belt, a filtering frame belt of resilient material in the form of an endless ladder trained over a pair of wheels being brought into contact with the upper face of the filter medium in such a manner that said filtering frame belt is traveled together with said filter medium without substantial sliding of the latter belt, and slurry, washing liquid or the like being fed into each of the filtering frames formed with the latter belt on the filter medium. In the above filter, slurry is once charged into the filtering frames in the filtering frame belt travelling together with the filter medium and the slurry is filtered after once filling said frames so that the decrease in vacuum degree due to the ill-balanced charge of the slurry is fully prevented, and feeding of the washing liquid into said frames prevents the back-flowing of the liquid so that mixing of the washing liquid with filtrate can be avoided. Furthermore, in the vacuum filter according to the present invention, the filter medium in the form of an endless belt can once be separated continuously during a filtering operation so that an easy separation of cakes from the filter medium and also a continuous and perfect washing of the filter medium can be attained.

DESCRIPTION OF THE DRAWING

Other and preferred features and attendant advantages of the present invention will become more readily apparent from the following description, given by way of example, in connection with the accompanying drawings in which.

DESCRIPTION OF SPECIFIC EMBODIMENT

Figure 1:
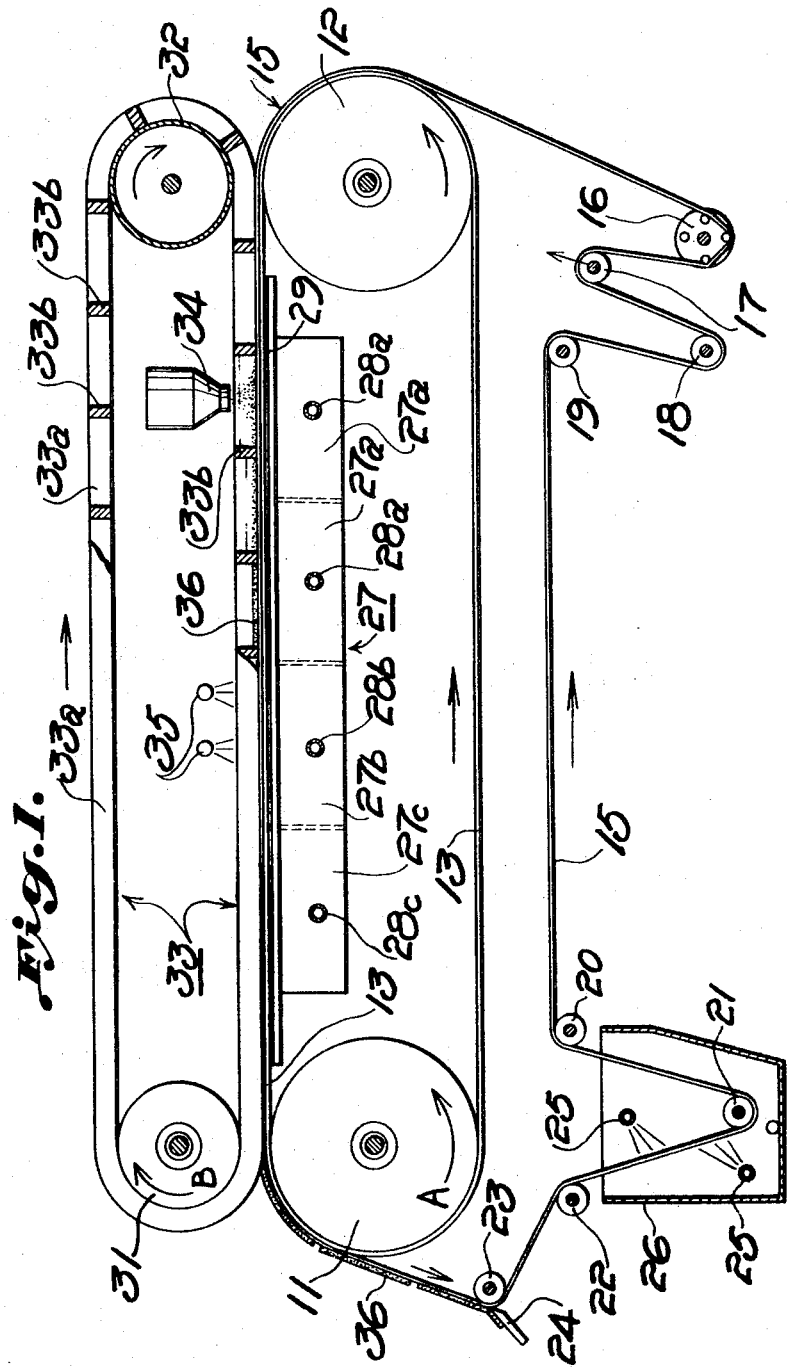
FIG. 1 is an elevational side view, partially out away, of one embodiment of the horizontally travelling-type vacuum filter according to the present invention.
Figure 2:
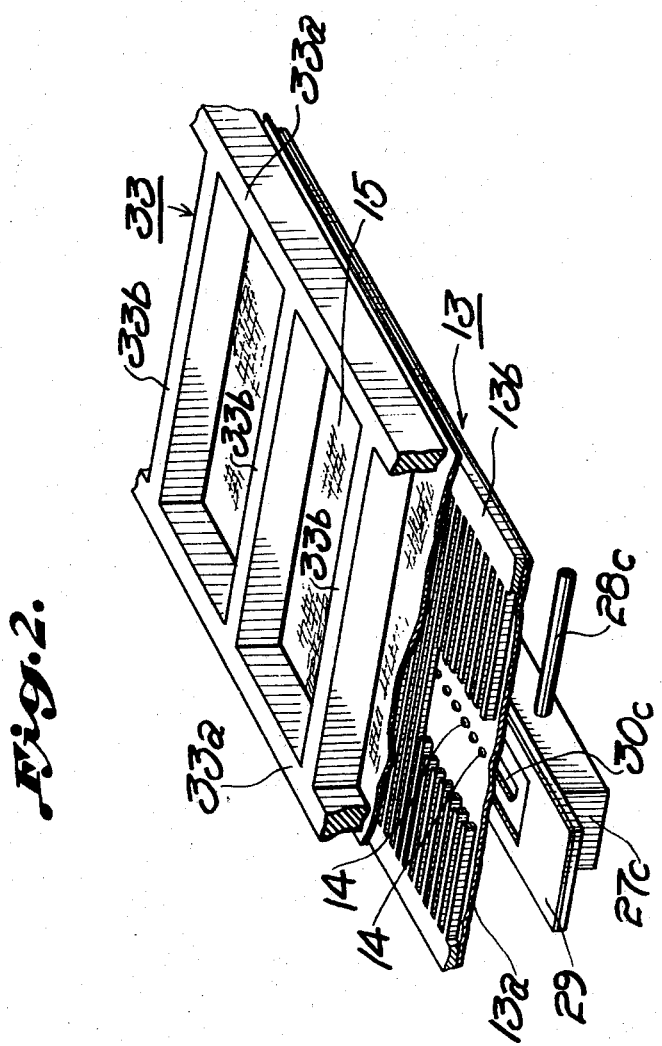
FIG. 2 is an enlarged perspective view of the section of a conveyor belt in the filter shown in FIG. 1.

Referring now to the drawings, there is shown a preferred embodiment of the horizontally travelling-type vacuum filter according to the present invention in FIG. 1. In the filter, an endless conveyor belt 13 is trained over a driving drum 11 and a take-up drum 12 both of which are rotably mounted on the apparatus frame (not shown in the drawings). As shown in FIG. 2, the conveyor belt 13 is made of an endless stainless steel band or the like 13a the outer face of which is covered with lining of rubber 13b. A number of perforations 14 are provided in the stainless steel band 13a and a filter medium-supporting bed in the form of assemblage of crosspieces is formed in the rubber lining 13b.

A filter medium 15 in the form of an endless belt is integrated on the upper and outer face of the conveyor belt 13 in such a manner that said endless filter medium 15 is traveled together with the conveyor belt 13 above and between the drums 11 and 12 and apart from the conveyor belt 13 below the upper faces of the drums 11 and 12 while being trained by said drums 11 and 12, a deviation-correcting roller 16, a take-up roller 17, guiding rollers 18, 19, 20, 21 and 22 and cake-discharging roller 23. There is provided at the cake-discharging roller 23 a scraper 24 for removing cakes from the filter medium 15. Further, on the way of the travel of the medium 15, there is provided washing means for the filter medium 15 which means comprise a pair of washing nozzles 25 and a receptacle 26 for washing water injected out of the nozzles 25.

Below the conveyor belt 13, there is provided a suction or vacuum box 27 divided into two filtering zones 27a, a washing zone 27b and a de-watering or drying zone 27c each of which is communicated to a common vacuum source (not shown in the drawings) through pipes 28a, 28b and 28c respectively. The suction or vacuum box 27 is slidably engaged with the inner face of the conveyor belt 13, namely the inner face of the stainless steel band 13a, at the upper face portion of the box through a sealing member 29, and each of the aforementioned zones 27a, 27b of the box 27 is communicated to the filter medium-supporting bed of rubber lining 13b through apertures 30a, 30b or 30c (only the apertures 30c are shown in the drawings) provided in the upper face of each of the zones in the drawings) and through the perforations 14 in the stainless steel band 13a.

Above the filter medium 15, there are provided a pair of rotary drums 31 and 32 rotably mounted on the apparatus frame which drums train a filtering frame belt 33 in the form of an endless ladder. Said filtering frame belt 33 is made of suitable resilient material such as rubber and consists of a pair of parallel endless bands 33a spaced apart from each other by a suitable distance and a number of dividing walls 33b bridged between said pair of endless bands 33a, so that a lot of filtering frames are formed in said endless frame belt 33 in a series relation along the travelling path of the frame belt. The frame belt 33 is brought at the outer circumference thereof into contact with the upper face of the filter medium in such a manner that the frame belt 33 is traveled together with the filter medium 35 without substantial sliding of the belt 33.

In addition, there are provided above the filtering frames feeding means 34 for slurry and washing nozzles 35 for cakes.

During a filtering operation, the driving drum 11 and the drum 31 are driven in the directions shown with arrows A or B respectively so as to travel the filter medium 15 and the filtering frame belt 33 integrated on the medium at a same speed of travelling, slurry is charged into the filtering frames by the feeding means 34 and washing water for cakes is fed into the filtering frames with the washing nozzles 35. In this case, slurry charged into the filtering frames in the frame belt 33 once fills each of said filtering frames divided with the bands 33a and the dividing walls 33b and then is filtered through the filter medium 15 when concerned filtering frame passes above the filtering zones 27a in the suction box 27. Cakes 36 thus produced on the medium 15 are washed and then de-watered or dried when concerned filtering frame passes above the washing zone 27b and then above the de-watering or drying zone 27c in the suction box 27, and then said cakes 36 are withdrawn out of the filtering frames in the frame belt 33 with remaining adhered on the filter medium 15 when the belt 33 leaves the filter medium 15. Said cakes 36 are then separated out of the medium 15 when said medium passes around the cake-discharging roller 23. The filter medium 15 is then washed with washing water injected out of the nozzles 25.

In addition, the washing nozzles 35 for cakes and also the washing zone 27b in the suction or vacuum box 27 may be omitted when there is no need of washing of cakes owing to the nature of said cakes.

Since slurry is once charged, in the filter according to the present invention, into the filtering frames in the filtering frame belt 33 travelling together with the filter medium 15 and is filtered after once filling said filtering frames as stated in the above, the decrease in vacuum degree due to the ill-balanced charge of slurry as well as the mixing of washing liquid for cakes with filtrate are never caused whereby the aforementioned defects of the horizontal belt filter can be avoided fully. Further, there are no needs, in the filter according to the present invention, of sealing means at the both lengthwise sides of the endless conveyor belt such as upwardly projected sidewall portions of the belt or a side-sealing device and also no needs of sliding means and the like, so that a flat conveyor belt can be employed. Furthermore, the use of a conveyor belt of stainless steel with lining of rubber makes, in combination with the above stated, the conveyor belt very simple and strong.

Further, the filter medium in the filter according to the present invention is an endless one and is washed continuously in a separated state from the filtering frames so that continuous washing of said medium can be carried out very easily. Further, though the separation of washing liquid from filtrate is perfect, as detailed before, owing to the presence of the filtering frames, the frame belt for forming said filtering frames is brought into a separated state from the filter medium having cakes thereon after the completion of filtering, cake-washing and dewatering or drying processes so that the separation of cakes from the filter medium can be carried out very easily and perfectly whereby the aforementioned defects of the travelling pan filter are avoided fully.

In addition, since the filtering frame belt in the filter according to the present invention is composed of resilient material in the form of an endless ladder, not only the structure of said frame belt is simple and the preparation of the belt is easy, but also the frame belt exhibits an intimate contact with the filter medium and never gives damage to said medium.

Having now described the invention and having exemplified the manner in which it can be carried into practice, it is apparent to those skilled in the art that innumerable variations, applications, modifications and extensions of the basic principles involved may be made without departing from the spirit of the present invention. The invention is, therefore, to be limited only by the scope of the appended claims.

I claim:

1. A horizontally travelling-type vacuum filter comprising a frame, a pair of conveyor rollers rotatably mounted on the frame and spaced-apart in a generally horizontal direction, at least one filter roller mounted on the frame below the conveyor rollers, a suction box mounted on the frame between the conveyor rollers, an endless conveyor belt trained over the conveyor rollers to provide upper and lower conveyor belt portions extending between the conveyor rollers, the conveyor belt having inner and outer surfaces, the inner surface of the upper conveyor belt portion contacting the suction box, an endless filter belt carried by the outer surface of the upper conveyor belt portion and trained over the filter roller whereby the filter belt is separated from the lower conveyor belt portion, a pair of frame belt rollers rotatably mounted on the frame above the conveyor rollers and spaced apart in a generally horizontal direction, an endless frame belt formed of resilient material trained over the frame belt rollers to provide upper and lower frame belt portions extending between the frame belt rollers, the frame belt including a pair of spaced-apart parallel endless side bands and a plurality of dividing walls extending perpendicularly between the side bands and being spaced-apart to provide a plurality of filtering frames, the lower frame belt portion contacting the portion of the filter belt carried by the upper conveyor belt portion between the conveyor rollers for movement therewith, and feeding means mounted on the frame above the lower frame belt portion for feeding material to be filtered into the filtering frames of the lower frame belt portion.

2. The structure of claim 1 including scraping means and washing means mounted on the frame below the lower conveyor belt portion for washing and scraping the filter belt when it is separated from the conveyor belt.

3. The structure of claim 1 in which the conveyor belt comprises an inner perforated stainless steel belt and an outer perforated liner.

4. The structure of claim 3 in which the outer liner is formed of rubber.

5. The structure of claim 1 in which the feeding means is mounted adjacent the position at which the frame belt first contacts the filter belt.

6. The structure of claim 1 in which the suction box is divided into a filtering zone and a drying zone.

7. The filter of claim 1 in which the suction box is divided into a filtering zone, a washing zone, and a drying zone.

* * * * *